US012715380B2

(12) United States Patent
Yabu

(10) Patent No.: US 12,715,380 B2
(45) Date of Patent: Aug. 25, 2026

(54) SENSOR ARRANGEMENT STRUCTURE

(71) Applicant: Honda Motor Co., Ltd., Tokyo (JP)

(72) Inventor: Tomoya Yabu, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 329 days.

(21) Appl. No.: 18/468,741

(22) Filed: Sep. 18, 2023

(65) Prior Publication Data

US 2024/0092294 A1 Mar. 21, 2024

(30) Foreign Application Priority Data

Sep. 20, 2022 (CN) ........................ 202211144833.6

(51) Int. Cl.

*B60R 19/02* (2006.01)
*B60R 19/04* (2006.01)
*B60R 19/44* (2006.01)
*B60R 19/48* (2006.01)
*B60R 21/00* (2006.01)
*B60R 19/18* (2006.01)

(52) U.S. Cl.

CPC ............ *B60R 19/023* (2013.01); *B60R 19/04* (2013.01); *B60R 19/44* (2013.01); *B60R 19/48* (2013.01); *B60R 21/00* (2013.01); *B60R 2019/186* (2013.01); *B60R 2021/0004* (2013.01)

(58) Field of Classification Search

CPC . B60R 19/48; B60R 19/023; B60R 2019/186; B60R 2019/1873; B60R 19/04; B60R 19/44

See application file for complete search history.

(56) References Cited

U.S. PATENT DOCUMENTS 9,718,423 B2 8/2017 Higashimachi et al.
10,668,881 B2 * 6/2020 Yoshida ................ B60R 19/483
2018/0272971 A1 * 9/2018 Syvertsen ........... B60R 21/0136
2021/0094495 A1 4/2021 Park

FOREIGN PATENT DOCUMENTS

CN 105501162 4/2016
CN 108698549 10/2018
CN 216034220 3/2022
FR 3024690 A1 * 2/2016 ......... B60R 21/0136

(Continued)

OTHER PUBLICATIONS

"First Office Action of China Counterpart Application", issued on Mar. 9, 2026, with English translation thereof, p. 1- p. 10.

*Primary Examiner* — Daniel J Colilla
(74) *Attorney, Agent, or Firm* — JCIPRNET

(57) ABSTRACT

A sensor arrangement structure that may improve sensing accuracy of a sensor tube and may make a sensor cover easy to install is disclosed. The sensor arrangement structure includes a bumper beam; a shock absorber disposed in front of the bumper beam; a contact sensor including a sensor tube, in which the sensor tube is disposed between the bumper beam and the shock absorber; and a sensor cover covering the shock absorber from a rear surface of the shock absorber, in which the sensor cover is disposed along a side surface of an end portion of the bumper beam in a width direction of a vehicle, the sensor cover has a protruding portion at a position corresponding to the sensor tube, and the protruding portion protrudes towards the shock absorber.

2 Claims, 4 Drawing Sheets

(56) References Cited

FOREIGN PATENT DOCUMENTS

| | | | | | |
|---|---|---|---|---|---|
| JP | 2007302060 | A | * | 11/2007 | |
| JP | 2015150906 | | | 8/2015 | |
| JP | 2016016747 | | | 2/2016 | |
| JP | 2016165978 | A | * | 9/2016 | |
| JP | 6070647 | B2 | * | 2/2017 | ............. B60R 19/18 |
| JP | 2017024477 | A | * | 2/2017 | |

* cited by examiner

SENSOR ARRANGEMENT STRUCTURE

CROSS-REFERENCE TO RELATED APPLICATION

This application claims the priority benefit of China application serial no. 202211144833.6, filed on Sep. 20, 2022. The entirety of the above-mentioned patent application is hereby incorporated by reference herein and made a part of this specification.

BACKGROUND

Technical Field

This disclosure relates to a partial structure of a vehicle body, in particular to a sensor arrangement structure.

Description of Related Art

In recent years, efforts to provide access to sustainable transportation systems that also take into account the vulnerable position of people such as the elderly or children among traffic participants are becoming active. In order to achieve the stated purpose, research and development related to crash safety performance has been devoted to further improving the safety or convenience of transportation. In the development related to crash safety performance, a sensor tube installed between the bumper beam and the shock absorber is used to sense the impact force of the vehicle against an object (such as a pedestrian) at the shock absorber as a basis for safe driving control of the vehicle. However, the sensor tube may float due to the gap between it and the sensor cover, which reduces the sensing accuracy of the sensor tube. Thus, it is necessary to improve the design of the sensor arrangement structure to overcome the described problem.

SUMMARY

The disclosure provides a sensor arrangement structure, which may improve sensing accuracy of a sensor tube and may make a sensor cover easy to install.

The disclosure provides a sensor arrangement structure including a bumper beam; a shock absorber disposed in front of the bumper beam; a contact sensor including a sensor tube, in which the sensor tube is disposed between the bumper beam and the shock absorber; and a sensor cover covering the shock absorber from a rear surface of the shock absorber, in which the sensor cover is disposed along a side surface of an end portion of the bumper beam in a width direction of a vehicle, the sensor cover has a protruding portion at a position corresponding to the sensor tube, and the protruding portion protrudes towards the shock absorber.

In an embodiment of the disclosure, the protruding portion has a convex portion at a position corresponding to a bent portion of the sensor cover, and the convex portion protrudes towards an inner side of the vehicle.

In an embodiment of the disclosure, the protruding portion spans the bent portion in a horizontal direction, the bent portion has a cutout, and the cutout is located on at least one of an upper side of the protruding portion and a lower side of the protruding portion.

Based on the above, in the sensor arrangement structure of the disclosure, the protruding portion of the sensor cover protrudes towards the shock absorber so that the sensor tube may be confined between the sensor cover and the shock absorber, so as to avoid the sensor tube floating due to a gap between the sensor tube and the sensor cover. Thus, the sensor arrangement structure of the disclosure may improve the sensing accuracy of the sensor tube. In addition, during installation of the sensor cover, the sensor cover may be temporarily positioned by means of the protruding portion of the sensor cover. Thus, the sensor arrangement structure of the disclosure may make the sensor cover easy to install.

To make the aforementioned more comprehensive, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
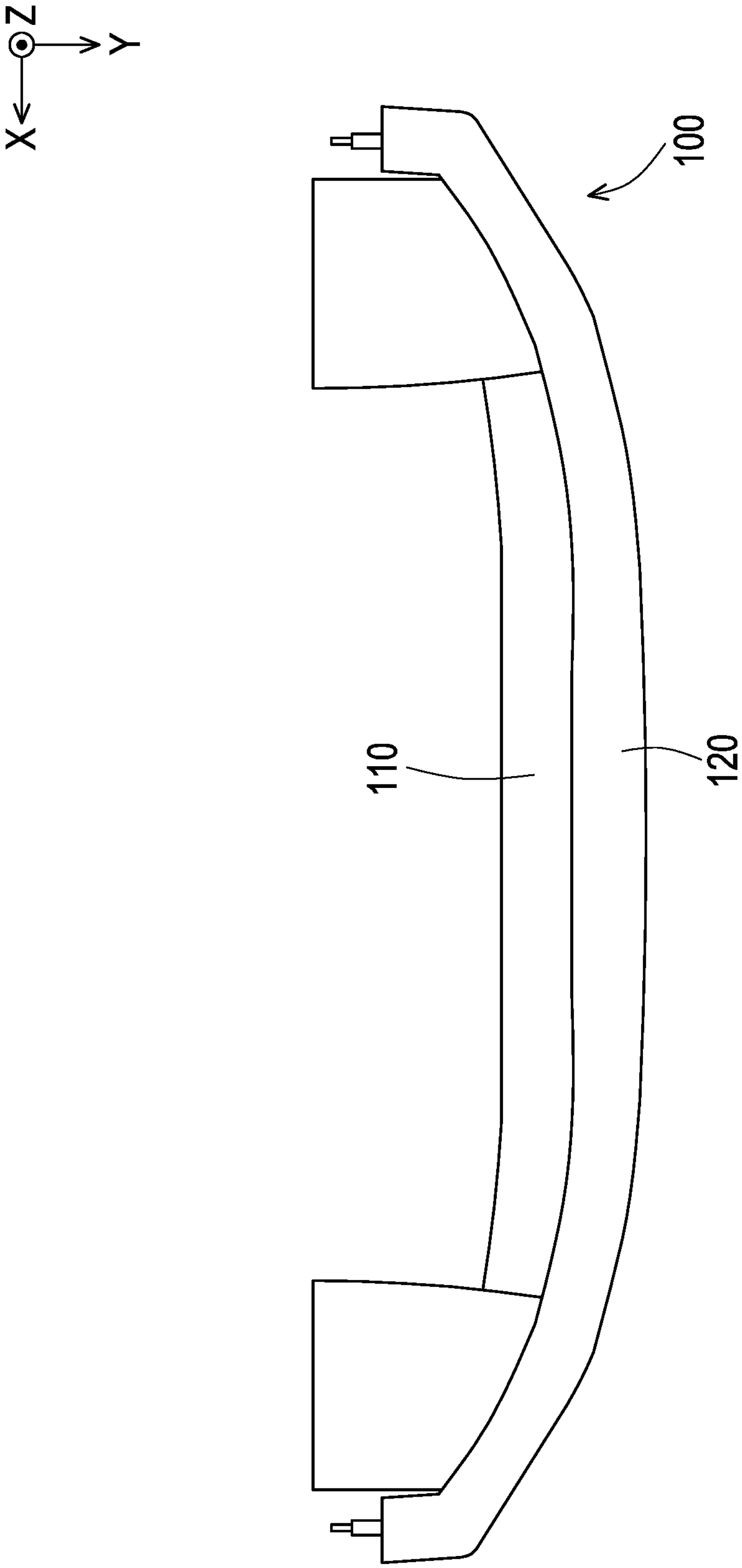
FIG. 1 is a schematic top view of a sensor arrangement structure according to an embodiment of the disclosure.
Figure 2:
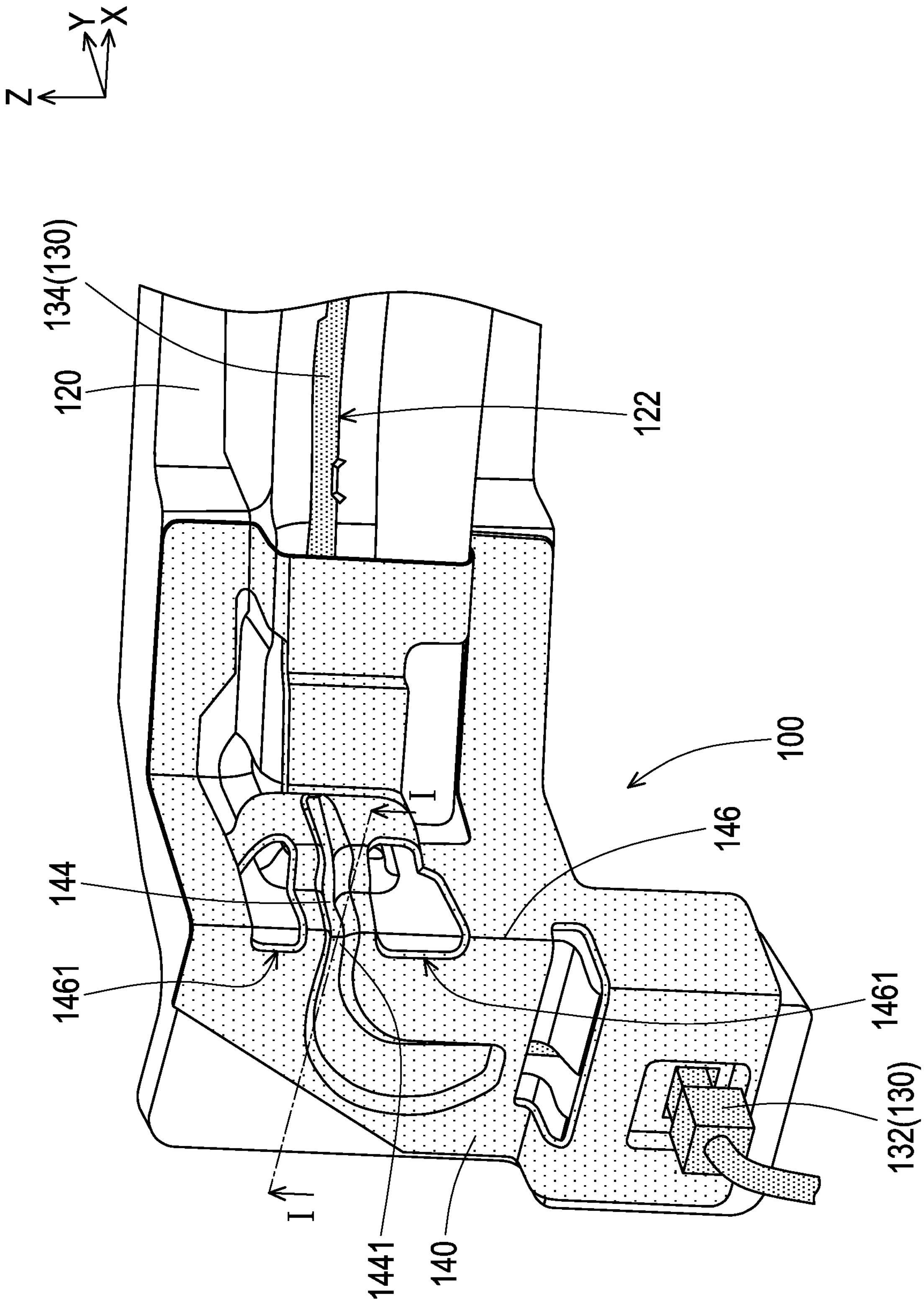
FIG. 2 is a partial perspective view of the sensor arrangement structure in FIG. 1.
Figure 3:
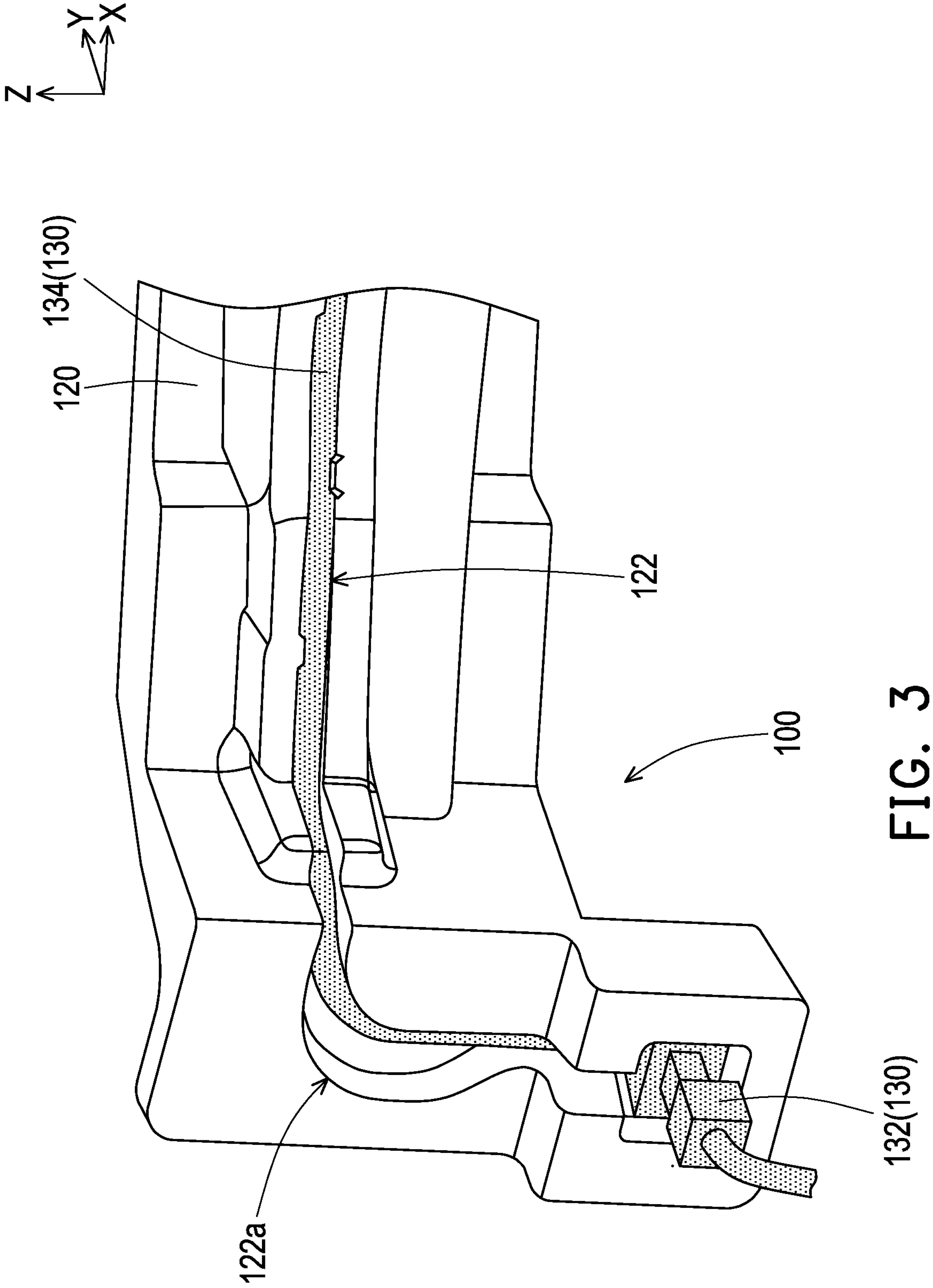
FIG. 3 is a perspective view of some components of the sensor arrangement structure of FIG. 2.

FIG. 1 is a schematic top view of a sensor arrangement structure according to an embodiment of the disclosure, in which axes X, Y, and Z are drawn. FIG. 2 is a partial perspective view of the sensor arrangement structure in FIG. 1. FIG. 3 is a perspective view of some components of the sensor arrangement structure of FIG. 2. Referring to FIG. 1 to FIG. 3, a sensor arrangement structure 100 of this embodiment includes a bumper beam 110, a shock absorber 120, a contact sensor 130, and a sensor cover 140. The bumper beam 110 is, for example, a front bumper beam of a vehicle, and the shock absorber 120 is, for example, a foam material and is disposed in front of the bumper beam 110 in a forward and backward direction of the vehicle (i.e., a direction parallel to the axis Y) to provide a cushioning effect in the event of an impact.

The contact sensor 130 is fixed on the shock absorber 120 and includes a sensor body 132 and a sensor tube 134. The sensor tube 134 is disposed between the bumper beam 110 and the shock absorber 120 and connected to the sensor body 132. The sensor cover 140 is screw-locked or otherwise suitably assembled to the shock absorber 120 while covering the shock absorber 120 and the sensor tube 134 on the shock absorber 120 from a rear surface of the shock absorber 120, and the contact sensor 130 is sandwiched between the sensor cover 140 and the shock absorber 120. The shock absorber 120 has a groove 122 for arranging the sensor tube 134. When the vehicle is subjected to an impact force at the shock absorber 120, the impact force is transmitted to the sensor tube 134 and causes the pressure in the sensor tube 134 to change. The sensor body 132 senses the pressure change in the sensor tube 134 to determine the impact force applied to the vehicle at the shock absorber 120.

Figure 4:
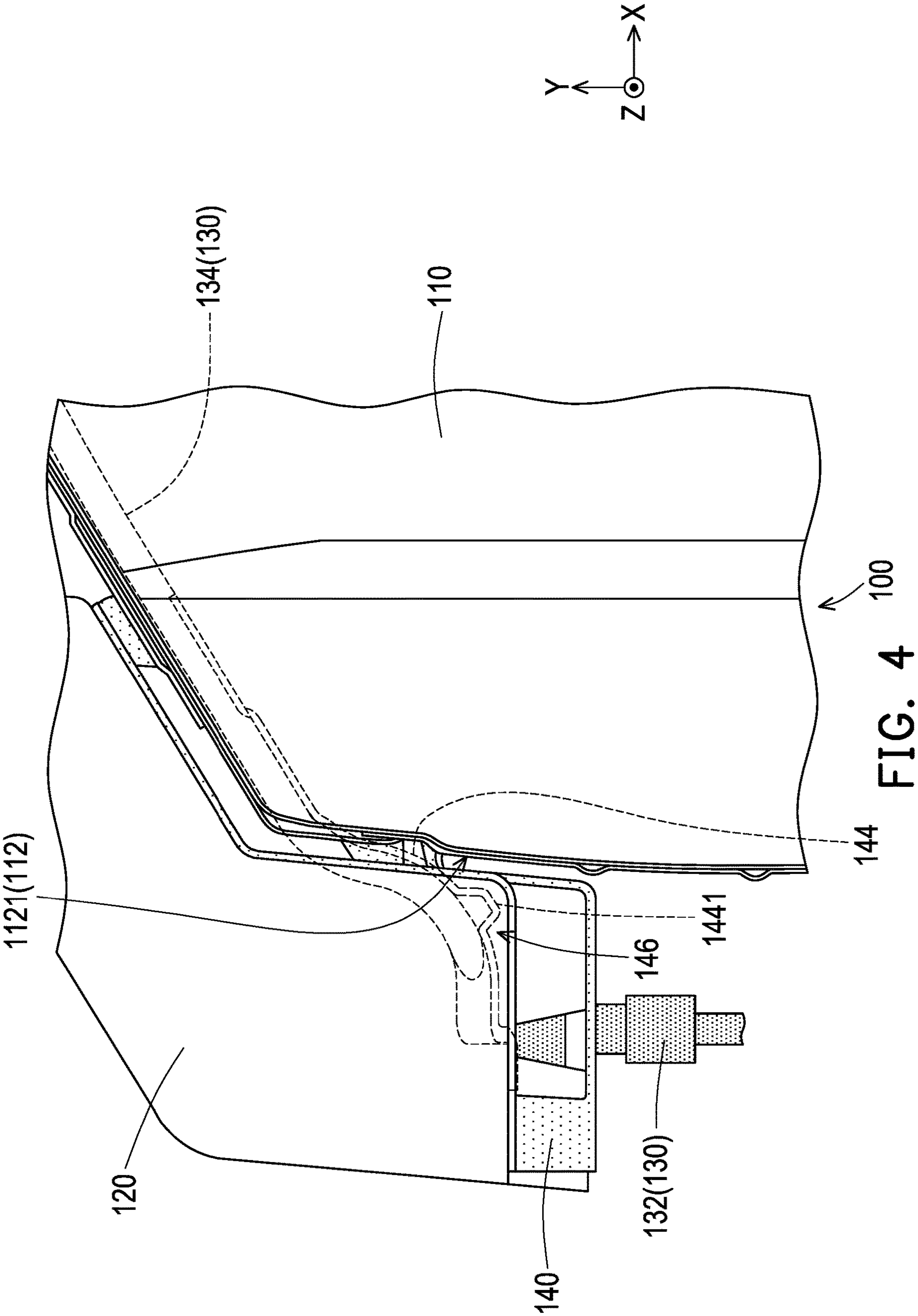
FIG. 4 is a cross-sectional view of the sensor arrangement structure of FIG. 2 along line I-I.

FIG. 4 is a cross-sectional view of the sensor arrangement structure of FIG. 2 along line I-I, which illustrates a part of the bumper beam 110. Referring to FIG. 2 to FIG. 4, the sensor cover 140 of this embodiment is disposed along a side surface 1121 of an end portion 112 of the bumper beam 110 in a width direction (i.e., a direction parallel to the axis X) of a vehicle. The sensor cover 140 has a protruding portion 144 at a position corresponding to the sensor tube 134, and the protruding portion 144 protrudes towards the shock absorber 120. With this configuration, the protruding portion 144 of the sensor cover 140 protrudes towards the shock absorber 120 so that the sensor tube 134 may be confined between the sensor cover 140 and the shock absorber 120, so as to avoid the sensor tube 134 floating due to a gap between the sensor tube 134 and the sensor cover 140. Thus, the sensor arrangement structure 100 of the disclosure may improve the sensing accuracy of the sensor tube 134. In addition, during installation of the sensor cover 140, the sensor cover 140 may be temporarily positioned in the groove 122 of the shock absorber 120 by means of the protruding portion 144 of the sensor cover 140. Thus, the sensor arrangement structure 110 of the disclosure may make the sensor cover 140 easy to install.

In addition, in this embodiment, the protruding portion 144 of the sensor cover 140 has a convex portion 1441 at a position corresponding to a bent portion 146 of the sensor cover 140, and the convex portion 1441 protrudes towards an inner side of the vehicle. That is, the convex portion 1441 protrudes in a direction away from the sensor tube 134. Accordingly, the sensor cover 140 has a lower structural strength at the convex portion 1441, and may be moderately bent and deformed when the sensor cover 140 is subjected to impact forces and squeezed toward the bumper beam, avoiding the sensor cover 140 being stretched due to impact forces resulting in excessive displacement of the protruding portion 144 and failure to well confine the sensor tube 134.

Furthermore, in this embodiment, the protruding portion 144 of the sensor cover 140 spans the bent portion 146 of the sensor cover 140 in a horizontal direction (i.e., a direction perpendicular to the axis Z). The bent portion 146 of the sensor cover 140 has multiple cutouts 1461, and the cutouts 1461 are located on an upper side of the protruding portion 144 and a lower side of the protruding portion 144 and correspond in position to the convex portion 1441, respectively. Accordingly, the sensor cover 140 further reduces its structural strength at the bent portion 146 by means of the cutouts 1461 to cause bending deformation of the bent portion 146 and the convex portion 1441 when the sensor cover 140 is subjected to the impact force as described above, so as to indeed avoid stretching of the sensor cover 140 due to the impact force as described above. In other embodiments, the cutouts 1461 may be formed only on the upper side of the protruding portion 144 or only on the lower side of the protruding portion 144, which is not limited by the disclosure.

To sum up, in the sensor arrangement structure of the disclosure, the protruding portion of the sensor cover protrudes towards the shock absorber so that the sensor tube may be confined between the sensor cover and the shock absorber, so as to avoid the sensor tube floating due to a gap between the sensor tube and the sensor cover. Thus, the sensor arrangement structure of the disclosure may improve the sensing accuracy of the sensor tube. In addition, during installation of the sensor cover, the sensor cover may be temporarily positioned by means of the protruding portion of the sensor cover. Thus, the sensor arrangement structure of the disclosure may make the sensor cover easy to install.

It will be apparent to those skilled in the art that various modifications and variations can be made to the disclosed embodiments without departing from the scope or spirit of the disclosure. In view of the forthcoming, it is intended that the disclosure covers modifications and variations provided that they fall within the scope of the following claims and their equivalents.

What is claimed is:

1. A sensor arrangement structure comprising:

a bumper beam;

a shock absorber disposed in front of the bumper beam;

a contact sensor comprising a sensor tube, wherein the sensor tube is disposed between the bumper beam and the shock absorber; and a sensor cover covering the shock absorber from a rear surface of the shock absorber, wherein the sensor cover is disposed along a side surface of an end portion of the bumper beam in a width direction of a vehicle, the sensor cover has a protruding portion at a position corresponding to the sensor tube, and the protruding portion protrudes towards the shock absorber, the protruding portion has a convex portion at a position corresponding to a bent portion of the sensor cover, and the convex portion protrudes towards an inner side of the vehicle.

2. The sensor arrangement structure according to claim 1, wherein the protruding portion spans the bent portion in a horizontal direction, the bent portion has a cutout, and the cutout is located on at least one of an upper side of the protruding portion and a lower side of the protruding portion.

* * * * *